127,399

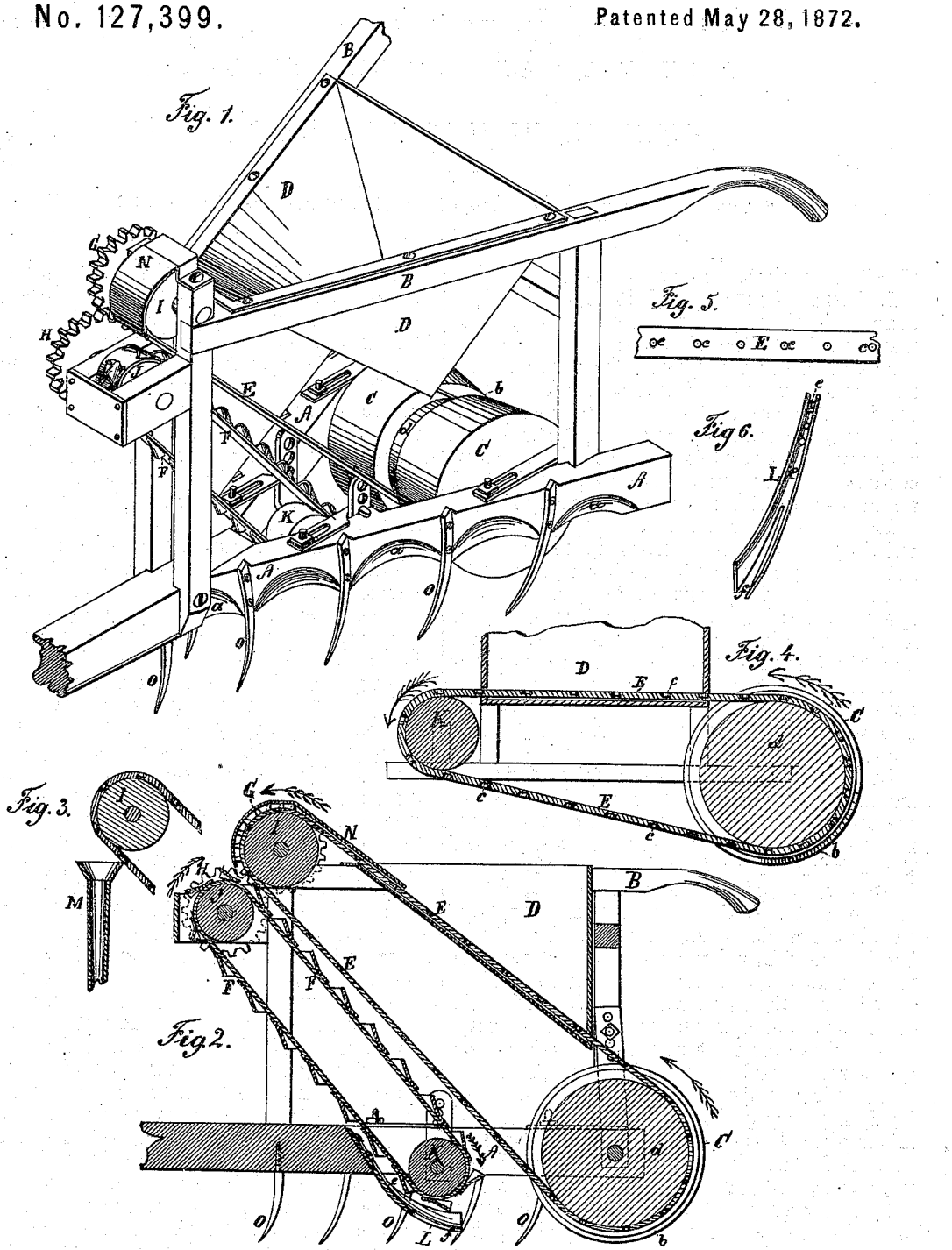

UNITED STATES PATENT OFFICE.

JACK WOOD, OF WEDOWEE, ALABAMA.

IMPROVEMENT IN COTTON-PLANTERS.

Specification forming part of Letters Patent No. 127,399, dated May 28, 1872.

*To all persons whom it may concern:*

I, JACK WOOD, of Wedowee, Randolph county, Alabama, have invented Improvements in Cotton-Seed Planters.

The nature of the invention is in combining an indented revolving band with a revolving band of buckets, and in combining a furrow-plow with an indented revolving band and a revolving band of buckets, to receive and carry cotton-seeds from a seed-box to the trough of a furrow-plow of a cotton-seed planter.

The invention is illustrated by the accompanying drawing and following description, both having the same indicating characters.

Of the drawing, Figure 1 represents a perspective, and Fig. 2 a sectional, view of the invention. Fig. 3 represents a view of one, and Fig. 4 of another, modified form of the invention. Fig. 5 represents a view of an indented carrying-band; and Fig. 6 represents a view of a hollow slotted marker or furrow-plow.

In the drawing, A indicates the under part, and B the upper part, of a combined frame, the under part being the frame of a harrow and the upper part the frame of a seed-box; C, a driving-wheel; D, a seed-box; E, an indented carrying-band; F, a series or carrying-band of buckets; G one, and H another, cog-wheel; I one, and J another, and K another, band-pulley; L, a furrow-plow or hollow slotted marker; M, a conducting-spout; N, a shield; and O, a series of harrow-teeth. In the drawing, also, $a$ indicates a series of scallops in the outer sides of the harrow-frame A; $b$, a bevel or incline inwardly from each outer end or edge on the tread of the driving-wheel B; $d$, a pulley-groove in the middle of the driving-wheel B; $c$, a series of indentations or cavities in the carrying-band E; $e$, a hollow or groove; and $f$, a slot in the furrow-plow F.

In cultivating cotton it is found better to have the plants or stalks one in a place, and as well aligned as may be; and the primary object of the invention is to plant cotton-seeds one in a place, with regular intervals, in well-aligned rows; but it may be adapted to any seed-planting.

The machine shown is designed to be drawn by a horse and be guided by a person walking behind, as a common plow is guided. The seeds to be planted are carried in the seed-box D. As the machine moves forward the driving-wheel C revolves and drives the indented band E and bucket-band F by the pulley $d$ of the driving-wheel and the pulleys and cog-wheels I G H J K in the direction of the course of the arrows. In the carrying-band E is a series of indentations or cavities, $c$, in line, at a regular space apart, of any desired distance, and each large enough, but no larger than, to hold one seed, and on the bucket-band F is a series of buckets at a like regular distance apart, and large enough to catch and carry and drop the seeds. The indented carrying-band E enters the seed-box D from below through an aperture fitted to let it pass loosely but closely, and passes out upwardly and over the upper band-pulley I through a like aperture in the shield N. In passing through the seeds in the box D each cavity $c$ of the carrying-band E receives a seed, and only one, which is carried over the upper pulley I, the loosely but closely-fitting aperture of the shield N only allowing one seed at a time, and nothing but the band and the one seed in the cavity thereof, to pass through. As the band E passes over and under the upper pulley I each seed, as the band goes over, will fall out of its cavity $c$ and into a bucket of the bucket-band F. Thus each bucket of the bucket-band F will receive and carry down and under the bottom pulley K the seeds, one at a time, as they come from the indented carrying-band E, and drop them into a furrow of the ground through the slot $f$ of the furrow-plow L. As the machine moves along the furrow-plow L makes a slight mark or furrow, into which the seeds fall. The furrow-plow L, in making a furrow or channel for the seeds to fall into, necessarily throws up a slight ridge of earth on each side, and as the driving-wheel C follows with its inwardly-beveled surfaces $b$ it will throw these ridges and other loose earth into the middle and cover the furrow and seeds. The main wheel C is a roller as well as driving-wheel, and, following the harrow and covering of the seeds, it rolls the ground smoothly and leaves it in good form. The pulley-groove $d$ in the middle of the roller C prevents the packing of the earth directly over the seeds; but the two sides pack the earth on each side of the seeds so as to retain moisture and benefit the planting. In cultivating cotton almost universally the field is thrown up into parallel ridges, and the seeds planted on the top of the ridges. This is proved to be the better way so far as yet known. The form of the roller C is thus adapted to the shape of these ridges. The harrow-teeth O are fastened in any way to the outer sides of the timbers of the harrow-frame A, and are wider apart at the top than at the bottom to allow all obstructions to pass out readily, and in the space between each two teeth a scallop, a, is cut in the timber of the harrow-frame A for greater room and freedom for obstructions to pass. The distance apart the seeds are planted is determined by the space between the cavities c of the indented revolving carrying-band E. By making the cavities c of the carrying-band E of the necessary exact size, one or two or any given number of seeds can be planted at a time and in a place, as desired.

Fig. 3 of the drawing represents a modified form of the invention, in which a conducting-spout, M, is substituted in place of the revolving series of carrying-buckets F; and Fig. 4 represents another modified form, in which both the carrying-buckets F and conducting-spout M are dispensed with and the seeds dropped directly into the ground from the carrying-band E.

I claim—

1. The combination of an indented revolving band, E, with a revolving band of buckets, F, substantially as described.

2. The combination of a furrow-plow, L, with an indented revolving band, E, and a revolving band of buckets, F, substantially as described.

JACK WOOD.

Witnesses:
JAMES DENSMORE,
EDM. F. BROWN.